US012764468B2

(12) United States Patent
Gunnarsson et al.

(10) Patent No.: US 12,764,468 B2
(45) Date of Patent: Oct. 13, 2026

(54) METHOD AND SYSTEM FOR REPRODUCING SOUND

(71) Applicant: Sound Dimension AB, Karlstad (SE)

(72) Inventors: Fredrik Gunnarsson, Karlstad (SE); Helge Modén, Karlstad (SE)

(73) Assignee: Sound Dimension AB, Karlstad (SE)

( * ) Notice: Subject to any disclaimer, the term of this patent is extended or adjusted under 35 U.S.C. 154(b) by 13 days.

(21) Appl. No.: 18/572,584

(22) PCT Filed: Jun. 20, 2022

(86) PCT No.: PCT/EP2022/066751
§ 371 (c)(1),
(2) Date: Dec. 20, 2023

(87) PCT Pub. No.: WO2022/268733
PCT Pub. Date: Dec. 29, 2022

(65) Prior Publication Data
US 2025/0133340 A1 Apr. 24, 2025

(30) Foreign Application Priority Data
Jun. 21, 2021 (SE) .................................... 2150795-9

(51) Int. Cl.
*H04R 3/12* (2006.01)
*H04R 29/00* (2006.01)

(52) U.S. Cl.
CPC ............. *H04R 3/12* (2013.01); *H04R 29/002* (2013.01)

(58) Field of Classification Search
CPC .. H04R 3/12; H04R 2430/01; H04R 2420/07; G06F 3/165
USPC ................................ 381/58–59, 77–82, 107
See application file for complete search history.

(56) References Cited

U.S. PATENT DOCUMENTS 9,820,048 B2 * 11/2017 Veeramani ............... H04R 3/12
9,913,011 B1 * 3/2018 Giuliani ................... H04R 1/00
10,123,142 B2 * 11/2018 Lee ......................... H04S 7/308
10,631,090 B1 * 4/2020 Elliot ................... H04R 29/007
10,750,438 B2 * 8/2020 Young ................... H04W 48/18
(Continued)

FOREIGN PATENT DOCUMENTS

WO 2015/147737 A1 10/2015

*Primary Examiner* — Disler Paul
(74) *Attorney, Agent, or Firm* — Gabriela B. Tomescu, Esq.; KIPA AB

(57) ABSTRACT

The invention relates to a sound reproduction device (100; 204) for reproducing a first audio signal, the first sound reproduction device (100;204) being configured to operate according to a first mode and a second mode of operation. The sound reproduction device is, in the first mode, configured to determine at least one first signal reproduction parameter for processing the first audio signal when being reproduced by at least one second device (202, 203) operating according to the second mode. Furthermore, the device is configured to, in said second mode of operation, reproduce the first audio signal processed according to at least one first signal reproduction parameter. The sound reproducing device is further configured to scan for presence of a device already operating according to the first mode of operation, and selecting mode of operation based on the scan for presence of a device already operating according to the first mode of operation.

21 Claims, 5 Drawing Sheets

(56) References Cited

U.S. PATENT DOCUMENTS

| | | | | |
|---|---|---|---|---|
| 11,178,601 | B2 * | 11/2021 | Young ...................... | H04R 3/12 |
| 11,212,615 | B2 * | 12/2021 | Curtis ...................... | H04R 1/26 |
| 11,531,517 | B2 * | 12/2022 | Millington .............. | G06F 3/165 |
| 2013/0170647 | A1 | 7/2013 | Reilly et al. | |

* cited by examiner

METHOD AND SYSTEM FOR REPRODUCING SOUND

FIELD OF THE INVENTION

The present invention relates to reproduction of sound, and, more specifically, to a method and system for reproducing sound from a plurality of sound reproduction devices. The invention also relates to a computer program implementing the method according to the invention, as well as a device.

BACKGROUND OF THE INVENTION

There exist various kinds of sound reproduction systems, where such sound reproduction systems often are designed for a specific purpose.

For example, the functionality of sound reproduction systems can rely on a configuration where a pair of, or a set of, spaced apart loudspeaker units are used to reproduce sound to be experienced by one or more listeners, where the sound to be reproduced emanates from an input signal, such as an audio stereo signal.

Systems of the above kind are often suitable for use, e.g., in semi-permanent set-ups such as, for example, living rooms and various other suitable locations, at home, offices and/or in public areas. Systems utilising two spaced apart loudspeaker units can also be of a design that allow portability, but, as is realized, use of systems comprising separate components inherently imposes inconvenience in regard of portability.

Portable sound reproduction systems, are often, e.g. for convenience in portability, designed as single units, and hence with e.g. left and right output channels being reproduced by separate loudspeaker elements being enclosed in common housing, thereby forming a single unit. Such units may be limited in size to further enhance portability.

Systems of the above kind in general have in common that they are designed for a specific purpose.

SUMMARY OF THE INVENTION

It is an object of the invention to provide a method and system for reproducing sound that allows for various different sound reproduction configurations, and that in particular can be adapted to devices being presently at hand for participation in the sound reproduction also when the devices are not originally designed to operate in unison in a synchronised manner.

According to the present invention it is provided a first sound reproduction device for reproducing a first audio signal, the first sound reproduction device being configured to operate according to a first mode and a second mode of operation.

The first sound reproduction device is configured to, in said first mode of operation, to determine at least one first signal reproduction parameter to be used by at least one second device operating according to the second mode for processing the first audio signal when being reproduced by the at least one second device. The first sound reproduction device is configured to, in said second mode of operation, reproduce the first audio signal processed according to at least one first signal reproduction parameter.

The first sound reproducing device is further being configured to scan for presence of a device already operating according to the first mode of operation, and selecting mode of operation based on the scan for presence of a device already operating according to the first mode of operation. No user interaction is thereby required to pair with other devices, and no action required other than possibly set the device in a detectable mode, e.g. by launching an application. The device may also be configured to scan the environment regularly when being turned-on.

According to embodiments of the invention the device is configured to scan for presence of a device already operating according to the first mode of operation through wireless communication. The devices may hence be at a distance from each other, both during a detection stage and also during sound reproduction. According to embodiments of the invention, the device is configured to scan for presence of other devices within a predetermined distance and/or within reach of a particular communication protocol, such as a short-range signalling protocol. In this way it may be ensured that devices that are to play together are at a distance from each other allowing the devices to be listened to as a group of interacting devices.

As was discussed above, there exist various kinds of audio reproduction systems. These systems in general have in common, however, that devices of the systems are designed from the beginning to operate together.

According to the invention, it is provided a device that allows for a flexible composition of devices that are arranged to play together, where such devices need not be originally designed to operate together to reproduce sound in unison.

Furthermore, according to the invention, it is provided a solution that allows for a setup of a plurality of devices for reproducing an audio signal together as soon as the prevailing conditions allow for such a setup, and which also allows that a device automatically can be added to a group of devices that are already reproducing an audio signal in a synchronised manner, and where the devices may reproduce the same or different parts of the audio signal.

According to the invention, this is accomplished through a sound reproduction device being configured to reproduce a first audio signal, where the sound reproduction device is configured to selectively operate according to a first mode and a second mode of operation. The sound reproduction device may select whether to operate according to the first mode or the second mode in dependence of the prevailing conditions regarding other sound reproduction devices being within reach for communication with the device.

In particular, according to the first mode of operation, the first sound reproduction device is configured to determine at least one first signal reproduction parameter for processing the first audio signal when being reproduced by at least one second device operating according to the second mode. That is, the device is configured to determine one or more parameters to be used by at least one other sound reproduction device when reproducing an audio signal in a synchronised manner with further devices if such are present.

According to the second mode of operation, instead, the first sound reproduction device is configured to reproduce the first audio signal processed according to at least one first signal reproduction parameter, where the signal reproduction parameter is determined by a device operating according to the first mode of operation to then be received by a device operating according to the second mode of operation from a device operating according to a first mode of operation.

The sound reproduction device is further configured to scan for presence of a device already operating according to the first mode of operation, and select mode of operation based on the scan for presence of a device already operating according to the first mode of operation. Hence, the device may be configured to select the mode of operation based on a determination of whether there already is a presence of a device operating according to the first mode of operation, and also whether there is a presence of a device operating, or at least being ready to operate, according to the second mode of operation.

According to embodiments of the invention, the device is configured to, when detecting presence of a device already operating according to the first mode of operation, commence operation according to the second mode of operation. Hence the device may automatically join an ongoing synchronised reproduction of sound being carried out by one or more other devices. Alternatively, a sound reproduction of the audio signal may commence by the device joining a device operating according to the first mode.

Furthermore, the device may be configured to commence operation according to the first mode of operation when a device already operating according to the first mode of operation is not detected. In this way, synchronised reproduction of an audio signal may commence e.g. in case only one or more devices being capable to operate according to the second mode of operation are present, or the one or more devices for other reasons are not presently operating according to the first mode of operation.

According to embodiments of the invention, it is also possible to overtake the first mode of operation from a device already operating according to the first mode. This determination may be made, e.g., in dependence of capabilities in terms of calculation/signal processing, current charging status such as a charging level in case the devices are battery operated etc, so that the device being most suitable for carrying out the tasks of the first mode device is also designated to perform such tasks.

According to embodiments of the invention, the device is further configured to, when operating according to the first mode of operation, establish a sound reproduction capability and/or a device status of at least one second sound reproduction devices operating according to the second mode of operation. Furthermore, the at least one first signal reproduction parameter for processing the first audio signal is determined, e.g. by calculation, based on the established sound reproduction capability and/or device status of the at least one second sound reproduction device operating according to the second mode of operation.

This allows that a device operating according to the second mode can be provided with at least one signal reproduction parameter that controls the manner in which the device operating according to the second mode will reproduce the audio signal, where the signal reproduction parameter is adapted to the specific capabilities of the particular device operating according to the second mode of operation.

According to embodiments of the invention, the device is further configured to, when operating according to said first mode of operation, receive signals representing a sound reproduction capability and/or a device status transmitted by a sound reproduction device operating according to said second mode, and establish a sound reproduction capability and/or a device status of a device operating according to said second mode of operation based on the received signals.

That is, the sound reproduction capability and/or a device status of a device operating according to said second mode of operation can be determined, e.g., by the device operating according to the first mode receiving such information from the device operating according to the second mode. This information may include, e.g., reproduceable frequency range, maximum sound power, current charging status such as charging level (if applicable). Alternatively, or in addition, information 25 identifying the type of device can be received, so that the device operating according to the first mode may determine the sound reproduction capabilities e.g. by searching a database comprising sound reproduction capabilities of various different devices. The first sound reproduction device may have stored sound reproduction capabilities for a plurality of different devices, or search an external database.

According to embodiments of the invention, the device is further configured to, when operating according to said first mode of operation, determine different signal reproduction parameters for different devices operating according to said second mode. In this way the at least one signal reproduction parameter of each device can be determined specifically for each device participating in the reproduction of the audio signal, where the at least one signal reproduction parameter is adapted specifically for each device by taking into consideration the sound reproduction capabilities and possible other limitations of the particular device, such as charging level, when determining a signal reproduction parameter for the particular device.

According to embodiments of the invention, the device is configured to, when operating according to said first mode of operation:

- receive a sound reproduction capability and/or a device status of a device operating according to the second mode of operation;
- calculating, by means of calculation means, the at least one first signal reproduction parameter for processing the first audio signal;
- communicating the calculated at least one second signal reproduction parameter to processing means of the sound reproduction device operating according to the second mode.

The sound reproduction capability and/or device status may be received by suitable receiving means in the device, such as by a receiver responsive to any suitable short range communication protocol, such as, e.g., Bluetooth, IR, ZigBee, Wi-Fi Direct, Z-Wave. The at least one first signal reproduction parameter may then be calculated by calculation means such as any suitable kind of processor in device, where the processor may be in communication with the receiver. The calculated at least one signal reproduction parameter may then be transmitted, e.g., by a transmitter according to any suitable short range communication protocol to be received by the device for which the signal reproduction parameter is calculated.

According to embodiments of the invention, the device is configured to, when operating according to said first mode of operation:

- broadcast a request requesting sound reproduction devices operating according to the second mode to transmit an indication of a presence; and
- receive an indication of a presence of a device operating according to the second mode, the indication comprising at least a representation of an identity of the sound reproduction device operating according to the second mode.

The broadcast may be configured such that it can be simultaneously received by any one or more devices operating according to the second mode of operation, where such devices hence are requested to communicate an indication of presence, e.g., through short range communication, where the indication of presence transmitted by each device comprises information that allows the device operating according to the second mode to be identified. The identity may be an indication of the particular kind of device that the device operating according to the second mode constitutes, but may also constitute any kind of identity that allows the device to be distinguished from other devices operating according to the second mode, so that signal reproduction parameters intended for a particular device can also be communicated to the particular device.

According to embodiments of the invention the device, when operating according to said first mode of operation, is configured to request sound reproduction devices operating according to the second mode to transmit a representation of the sound reproduction capability of the device for use when calculating the sound reproduction parameters.

According to embodiments of the invention, the device is configured to, when operating according to said second mode of operation:

receive the least one first signal reproduction parameter for processing the first audio signal from a device operating according to said first mode of operation, and reproduce the first audio signal processed according to the received at least one signal reproduction parameter by means of at least one loudspeaker element.

Consequently, when operating according to the second mode of operation, the device may receive at least one signal reproduction parameter that has been calculated by a device operating according to the first mode of operation, and process the audio signal to be reproduced according the at least one signal reproduction parameter prior to reproducing the audio signal. The processing may comprise reproducing a particular frequency range and/or one or more particular channels, and/or a sound power to be applied. The processing may also include other kinds of processing, such as carrying out digital signal processing of the audio signal based on the at least one sound reproduction parameter, where such processing can be carried out using, e.g., a digital signal processor or any other suitable kind of processor.

According to embodiments of the invention, the first sound reproduction device may, when establishing the sound reproduction capabilities of a device operating according to the second mode, transmit a request to the device operating according to the second mode to reproduce a predetermined audio signal. The reproduced predetermined audio signal is then utilised by the device operating according to the first mode to establish the sound reproduction capability of the device operating according to the second mode by analysing the detected reproduction of the predetermined audio signal, e.g., following capture by one or more microphones of the first sound reproduction device.

According to embodiments of the invention, the sound reproduction capabilities of the device operating according to the second mode is determined through signal processing of the detected reproduced predetermined audio signal, where the at least one signal reproduction parameter can be calculated based on, e.g., frequency range and/or signal power and/or any other suitable measure of the detected audio signal.

The first audio signal to be reproduced may be an audio stream, and the device, when operating according to the second mode, may be configured to independently receive the first audio stream for processing according to a received at least one signal reproduction parameter, where the audio stream may be configured to be streamed from any suitable audio source such as a streaming service. According to embodiments of the invention the device is configured to receive the audio signal from another device, such as a device operating according to the first mode.

According to embodiments of the invention the device further comprises, when calculating the at least one sound reproduction parameter of a plurality devices, determining whether two or more of the devices are of a same design, and calculating sound reproduction parameters of devices being of a same design according to a same set of criteria, where e.g. certain parameters may be taken into consideration. Sound reproduction parameters of devices being of a different design may conversely be calculated according to a different set of criteria, where different parameters may be utilised when determining the sound reproduction capabilities.

According to embodiments of the invention the device comprises means for receiving software, such as by downloading an application, to be stored in the sound reproduction device, where the software is configured for calculating the at least one first signal reproduction parameter for processing the first audio signal by a device operating according to the second mode. Alternatively, or in addition, the software may be configured to process the first audio signal according to a calculated at least one first signal reproduction parameter.

According to embodiments of the invention the device comprises a non-transitory storage for storing software causing the device to selectively operate according to the first mode and the second mode.

Hence the download of software provides for a system that allows devices that are not originally designed to play together in a synchronised manner, and in a manner where the particular sound reproduction capabilities of each device may be taken into consideration when determining the sound reproduction parameters, to be used by the devices when simultaneously reproducing an audio signal.

According to embodiments of the invention, the device is configured to determine sound reproduction parameters of devices operating according to the second mode being such that the devices are configured to reproduce the audio signal in different manners, e.g. by differences in one or more from: frequency ranges of the first audio signal, one or more channels of the audio signal, sound power of the audio signal.

Further characteristics of the present invention and advantages thereof are indicated in the detailed description of exemplary embodiments set out below and the attached drawings.

DETAILED DESCRIPTION OF EXEMPLARY EMBODIMENTS

Embodiments of the present invention will be exemplified in the following in view of a particular kind of sound reproduction device. It is to be understood that according to embodiments of the invention the sound reproduction device may be essentially any kind of device, for as long as it is possible to provide it with means, such as suitable software and/or circuitry for causing the device to operate according to the invention. For example, according to embodiments of the invention, software may be stored, e.g. by being pre-loaded or downloaded, in a non-transitory storage of the device, where the software may make use of already existing circuitry of the device to cause the device to operate according to embodiments of the invention.

The sound reproduction device may hence be manufactured to operate according to embodiments of the invention, but according to embodiments of the invention the device may be configured to operate according to embodiments of the invention through the addition of software being installed at a later stage. Embodiments of the invention will also be exemplified in the following with reference to a mobile device being provided with the required software. The invention is however not limited to mobile devices, or portable devices for that matter, but may be utilised for any kind of device supporting use according to the invention, portable or non-portable.

Figure 1:
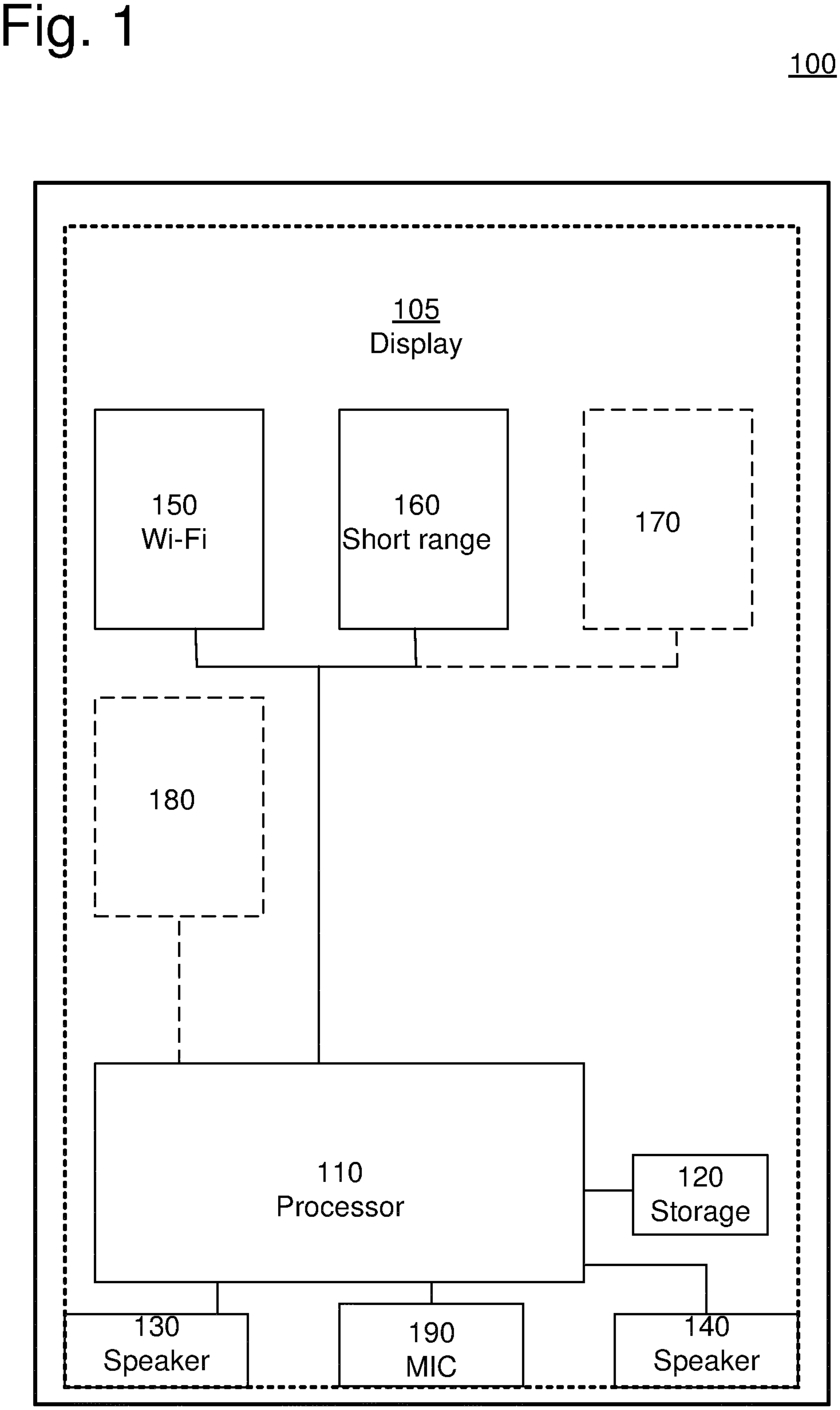
FIG. 1 illustrates an exemplary sound reproduction device according to embodiments of the invention.

FIG. 1 hence schematically illustrates a mobile device 100 in the form of a smartphone. It is contemplated that the mobile device may be of essentially any kind, such as a tablet, portable speaker, laptop, etc. It is also contemplated that the device need not be portable, but may e.g. constitute a TV or any other kind of device that is capable of being configured for operation according to the invention in the reproduction of an audio signal. According to this particular example, the mobile device 100 comprises a touch sensitive display 105 being configured to, in a manner known per se, display e.g. icons, key buttons, pictures and/or other kinds of information on the display 105. The touch sensitive display 105 also receives input from a user of the mobile device 100. Data being displayed on, and user input being received from, the display 105 is controlled by a processor 110 having an associated storage 120, such as any suitable kind of non-transitory memory.

The processor 105 take appropriate actions in response to input/information received e.g. from the user of the device, where such actions may e.g. be activation/execution of a program and/or a function. The mobile device further comprises, according to the present example, speakers 130, 140 for use, e.g., to reproduce an audio signal according to embodiments of the invention. The mobile device 105 also comprises means, such as a suitable transmitter and/or receiver 150 for Wi-Fi communication and means such as a suitable transmitter and/or receiver 160 for short range communication according to any suitable protocol, such as, e.g., Bluetooth, IR, Wi-Fi Direct, Zigbee, Z-Wave. The device 105 also comprises a microphone 190.

The mobile device 105 may also comprise various other components that are present but not illustrated, or only schematically by 170, 180, in the figure. For example, one or more antennas, receiver/transmitter/transceiver for mobile network communication etc. Hence the mobile device 100 is not restricted to only the components shown in the figures. It is also to be noted that the device may consist of various other kinds of devices than smartphones, portable or non-portable, as discussed.

As was mentioned above, the invention provides a solution that allows for a highly adaptable system for reproducing an audio signal, where various different devices may participate. According to the present example, the mobile device is provided with software for carrying out embodiments according to the invention, where such software may be prestored and form an integrated part of the mobile, device, but where the software may also be downloaded, e.g. as an app, and stored in suitable memory storage, such as storage 120.

In particular, the device 100 is configured to selectively operate according to a first mode and a second mode of operation, wherein, in said first mode, as discussed above, the device 100 is configured to determine at least one first signal reproduction parameter for processing an audio signal to be used by at least one second device operating according to the second mode, where in the second mode of operation, the device is configured to reproduce an audio signal processed according to at least one first signal reproduction parameter.

Figure 2:
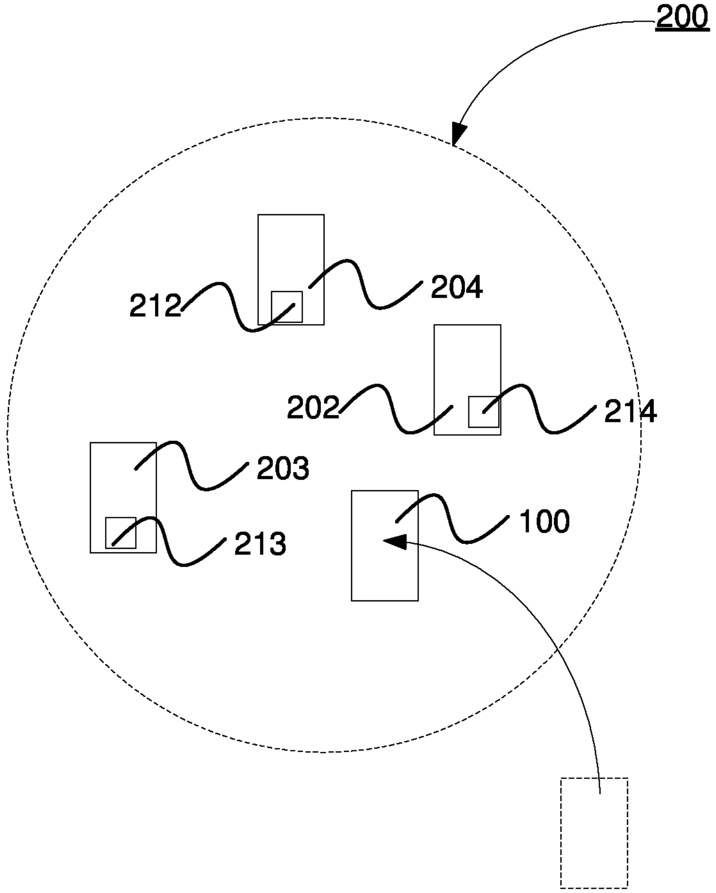
FIG. 2 illustrates a setup of sound reproduction devices being configured to operate according to embodiments of the invention.

FIG. 2 schematically illustrates an area 200 that the mobile device 100 enters. The area 200 represents, according to the present example, an area within which the mobile device 100 is within a communication range with one or more of devices 202-204 by means of any suitable short range communication means, such as, any of the above exemplified communication protocols or other communication protocols having similar capabilities, as is also exemplified above. One or more of the devices 202-204, which may be mobile/portable and/or stationary devices, are configured for communication according to at least one of the first mode and the second mode according to embodiments of the invention. In case the mobile device 100, instead, had constituted a stationary device, other devices may instead come within range of the stationary device. Furthermore, the devices 202-204 comprises e.g. a processor for processing the audio signal to be reproduced, loudspeaker elements for reproducing the audio signal and short range communication capabilities, etc., all jointly indicated by 212-214.

Figure 3:
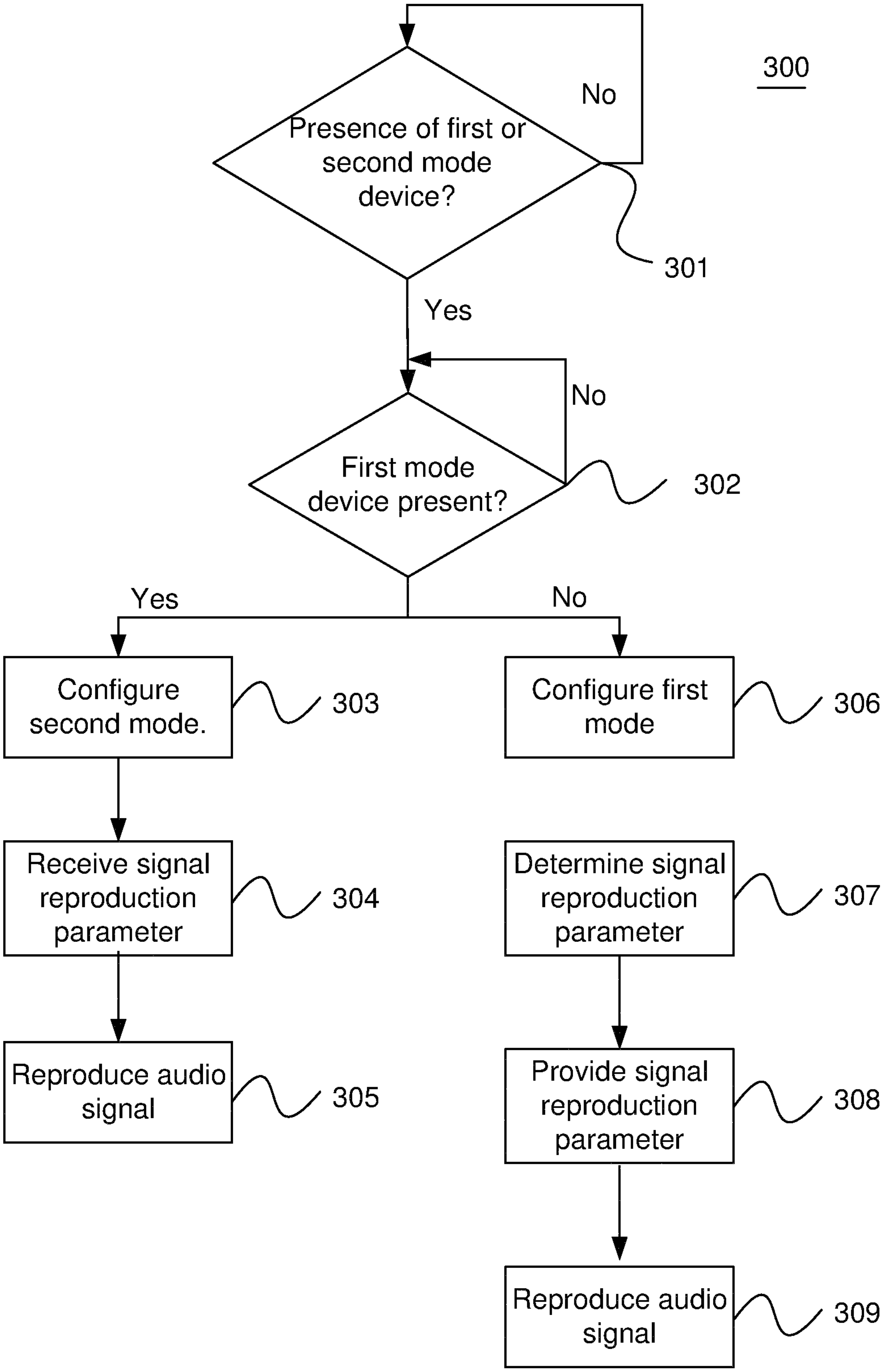
FIG. 3 illustrates an exemplary method according to embodiments of the invention.

An exemplary method 300 according to the invention is illustrated in FIG. 3. The method commences in step 301, where it is determined whether presence of another device operating according to the first or second mode is detected. When such a device is detected the method continues to step 302. This may be the case when the device 100 comes within range of any of the devices 202-204 in FIG. 3, and where one or more of these devices operate according to the first or second mode. The device 100, as well as one or more of the devices 202-204, may be set to be sensitive to such detection, e.g. by a software program currently running on the devices. The software program may be configured to run continuously while a device is active (turned on), or upon being set to run e.g. following software being activated, e.g. by a user interacting with the device. When the software is running the method may be arranged to be carried out without user interaction.

In step 302 it is determined whether there is a device operating according to the first mode of operation already present among the devices in communicational reach of the device 100. For example, any of the devices 202-204 may already be operating according to the first mode of operation, and the devices 202-204 may already be reproducing an audio signal, where each of the devices 202-204 may reproduce the same audio signal in synchronisation and/or different parts and/or channels of the audio signal, still in synchronism with each other. It is to be noted in this regard that the synchronisation among the devices reproducing an audio signal may be realised in any suitable manner. For example, short range communication protocols such as Bluetooth have synchronisation features already provided.

When it is determined in step 302 that there already is a device operating according to the first mode of operation, for example, device 204, the method continues to step 303, where the device 100 configures itself for operation according to the second mode of operation. In step 304 the device 100 receives at least one signal reproduction parameter for use when reproducing the first audio signal. The method then continues to step 305, where the audio signal already being reproduced by one or more of devices 202-204 is also reproduced by the device 100 in synchronism with the one or more of the devices 202-204 already reproducing the audio signal.

The device 100 may, in addition to receiving at least one signal reproduction parameter also receive the audio signal to be reproduced from the device 204. Alternatively, the device 100 may receive instructions for downloading the audio stream, e.g. from a streaming service or the Internet or a local source at the premises of the devices.

The audio signal may be configured to be either received directly by each one of the devices from a same source, such as any suitable streaming service, or any other kind of service capable of providing the audio signal. The audio signal may also be configured to be transmitted by one of the devices to other devices participating in the sound reproduction and/or the device operating according to the first mode.

When reproducing the audio signal together, the devices may provide a sound reproduction of a larger system even though each device may be relatively small with limited sound reproduction capabilities.

Further with regard to step 302, if it is determined in step 302 that there is no device present that currently operate according to the first mode of operation, the method continues to step 306 were the device 100, instead, configures itself for operation according to the first mode of operation. In step 307 at least one signal reproduction parameter for processing an audio signal to be reproduced is determined for one or more of the devices 202-204, and in step 308 the at least one signal reproduction parameter is provided to one or more devices operating according to the second mode, where such parameters may be communicated using a short range communication protocol as described.

In case there are more than one device that is to reproduce the audio signal, signal reproduction parameters may be determined for each such device be communicated to the respective devices, and in step 309 the audio signal is reproduced according to the at least one signal parameter by one or more of the devices.

According to embodiments of the invention, the device 100 may be configured to operate according to both the first mode of operation and the second mode of operation and may hence determine at least one signal reproduction parameter also for itself, and participate in the reproduction of the audio signal in step 309, where the audio signal can be provided according to the above.

This method according to FIG. 3 schematically illustrates an example according to embodiments of the invention. Embodiments of the invention will be described further in detail with reference to FIGS. 4 and 5. Similar to FIG. 3, the method according to FIGS. 4 and 5 may be carried out when the device 100 comes within range of one or more other devices.

Figure 4:
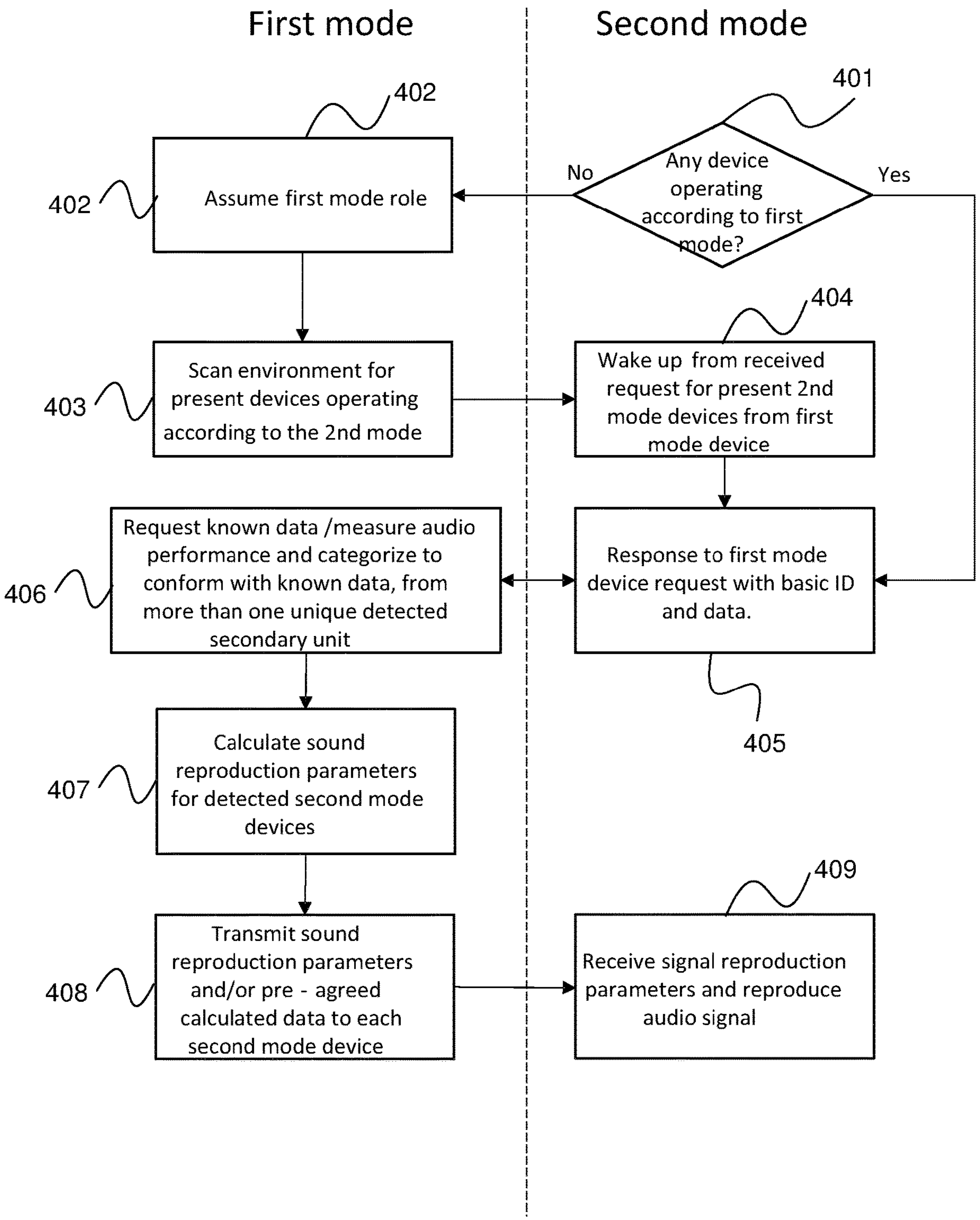
FIG. 4 illustrates a further exemplary embodiment according to embodiments of the invention.

The method according to FIG. 4 starts in step 401, where it is determined whether there are any present devices operating according to the first mode, e.g., by detecting presence of a signal transmitted by a device operating according to the first mode. When this is not the case, the method continues to step 402 where the device 100 assumes the role of the first mode according to the present example. In case the device 100 was already operating according to the second mode, the mode of operation may be switched to the first mode.

The method then continues to step 403, where the device 100, following commencement of operation according to the first mode, "scans" the environment, i.e. attempts to detect presence of other devices in the vicinity of the device 100 that are within range for short range communication. In particular, the device 100 scans for already present devices that operate, and/or are configured for operation, according to the second mode. According to embodiments of the invention only devices operating according to the first mode of operations may be configured to transmit presence signals at predetermined or regular intervals. According to embodiments of the invention this may instead be carried out by the devices according to both the first and the second mode.

The scanning according to step 403 may, for example, be carried out by the device 100 transmitting signals according to any suitable short range communication protocol as exemplified above, and where the transmitted signals may comprise requests, such as instructions and/or any suitable information that, when received by a device operating according to the second mode, causes the device operating according to the second mode to identify itself to the device operating according to the first mode. This is illustrated by step 404, where the received signal from the device 100 causes the device operating according the second mode to enter an active state from a wait state and take appropriate actions.

It is to be noted in this regard that the device 100, when carrying out the determination according to step 401, may enter such a wait state when it is detected that a device operating according to the first mode is already present according to step 401. In the following it is assumed that devices 202-204 are configured for operation according to the second mode. When a device operating according to the second mode, such as device 203 according to the present example, take action in response to the request received from the device 100, the device 203 responds to the device 100 by transmitting signals comprising at least some measure that is suitable for identification of the device 203, which may be any suitable representation of a identification for as long as the device 100 may utilize the identification to distinguish the device 203 from other devices. Such identification may be an identification being determined by identities, e.g. unique, being provided by the programming according to embodiments of the invention, but may in principle comprise any suitable identification, such as an identification already being used for other purposes of the device, where the identifier may be unique to the device. Such identification may also comprise the allocation of a particular communication resource being assigned to a particular device. The identification is used in the communication between the devices, in particular to signal instructions and sound reproduction parameters.

In addition to the identity, a device operating according to the second mode may also transmit other data, either directly or following a request from the device operating according to the first mode. This is illustrated by steps 405, 406, where there may be signalling going back and forth between the devices 100 and 203.

According to embodiments of the invention, the identity of the device operating according to the second mode may allow that the sound reproduction capability of the device may be deduced directly from this identity by the device operating according to the first mode. For example, the identity may itself be sufficient to allow a device operating according to the first mode to determine, e.g., the particular kind of device that the device constitutes. Data regarding the sound reproduction capabilities of the particular kind of device may then be, e.g., stored in a memory of the first mode device, and/or be downloadable, where such information may be stored for a plurality of different kinds of devices.

However, according to embodiments of the invention, the device operating according to the first mode may instead request that the device operating the second mode transmits information to be used when determining the sound reproduction capabilities of the device operating current second mode. Such information, may for example, comprise output sound power capabilities, one or more frequency ranges that the device is capable of reproducing sound within and any other kind of data being relevant to the sound reproduction capabilities of the particular device.

According to embodiments of the invention, the device 100 may, instead, request the device 203 to reproduce a predetermined audio signal, where the predetermined audio signal may be stored, e.g. permanently, in the device 203, and/or be transmitted from the device 100 to the device 203. The device 100 may then utilize, e.g., a microphone to record the sound reproduction of the device 203 when reproducing the predetermined audio signal. This recording may then be used to determine the sound reproduction capabilities through suitable signal processing of the recording, where e.g. frequency range, sound pressure etc may be estimated, e.g. through the use of a digital signal processor. Such sound reproduction data may then be stored for the particular type of device for later use when a same type of device again is detected. The sound reproduction data may be stored in a general database accessible to all devices operating according to the first mode of operation.

The steps 405 and 406 may be carried out for each device operating according to the second mode that responds to the device operating according to the first mode, such as each of the devices 202-204. When the sound reproduction capabilities have been determined for each device operating according to second mode that is to participate in the sound reproduction, the method continues to step 407. In step 407 at least one sound reproduction parameter is determined and/or calculated by the device 100 for each of the detected devices operating according to the second mode. The sound reproduction parameters may comprise various kinds of parameters, such as frequency range, power/volume level, one or more channels of a multi-channel audio signal etc.

When the sound reproduction parameters have been calculated or otherwise determined in step 407, the parameters are transmitted, step 408, to the device 203 and any one or more further devices operating according to the second mode. The devices operating according to the second mode then receives the at least one sound reproduction parameter intended for the particular device and applies the at least one sound reproduction parameter to the audio signal to be reproduced, and reproduces the audio signal in accordance with the received at least one parameter, step 409.

With regard to the sound reproduction parameters, these may, as discussed, comprise e.g. frequency range, power/volume level, one or more channels of a multi-channel audio signal to be reproduced, but may also comprise e.g. instructions and/or algorithms for signal processing the audio signal utilising a signal processor of the device operating according to the second mode. Furthermore, in case a device operating according to the second mode leaves a group of devices playing together the method may repeat steps 407-409 to adapt the reproduction of sound taking the changed setup of devices into consideration. This also applies when a new device operating according to the second mode is detected and is configured to participate in the sound reproduction.

Figure 5:
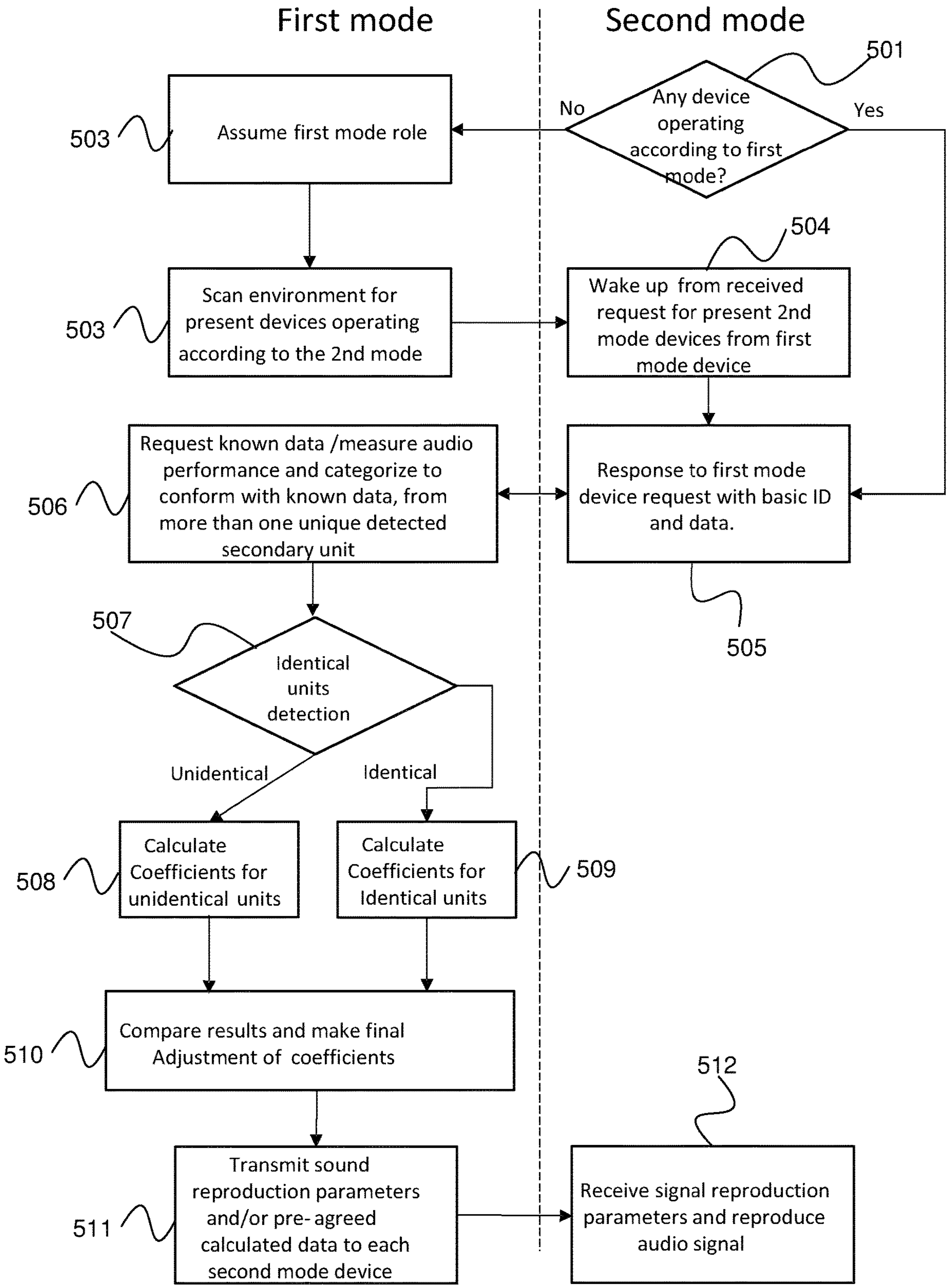
FIG. 5 illustrates a further exemplary embodiment according to embodiments of the invention.

FIG. 5 illustrates a further exemplary method according to embodiments of the invention. Steps 501-506 are similar to steps 401-406 of FIG. 4, and are therefore not discussed further. When the device 100 has established the presence of devices operating according to the second mode in step 506, the method continues to step 507, where it is determined if two or more of the devices operating according to the second mode are devices of a same/identical design, e.g. devices 202, 203. When this is the case, sound reproduction parameters may be calculated for these devices 202, 203 according one principle in step 509, whereas sound reproduction parameters of other, differently designed devices may be calculated according to a different principle in step 508. This may be performed for each two or more devices being of an identical design. When the calculations have been performed for each kind of design, the result of the signal reproduction parameters of the different kinds of devices may be compared in step 510, and adjustments of the signal reproduction parameters be made in case deemed needed for the overall sound reproduction, e.g. taking differences in the capabilities of the devices into account. This method allows, for example, that in case there are a plurality of devices of an identical kind the calculations can be carried out in an efficient manner from a computational point of view. Steps 511-512 of the method in FIG. 5 corresponds to steps 408-409 of FIG. 4, and hence the audio signal is reproduced as discussed above.

In sum, a plurality of devices may be configured to reproduce an audio signal in unison to thereby improve the overall quality of the sound being is reproduced, and thereby the overall experience of a listener, where e.g. devices having relatively different sound reproduction capabilities, and also devices having relatively limited sound reproduction capabilities, may work together in a controlled manner to provide a reproduction of the audio signal that, when reproduced by the plurality of devices in unison in a synchronised manner, is of a higher quality in comparison to when a single device is reproducing the audio signal.

Furthermore, since, according to embodiments of the invention, the functionality according to the invention may be made possible through downloading software, already existing devices may be configured to operate according to the invention also when the devices do not comprise such capabilities at the time of production. This also makes it possible to cause a plurality of device to play together, where the devices may be of highly different kinds and not at all intended to play in unison upon the time of production.

It is also contemplated that according to embodiments of the invention, a plug-in device having the capability to operate according to the first and/or second mode may be utilized to be connected to, for example, existing loudspeaker systems to thereby allow also such systems to participate in a sound reproduction according to the invention.

Furthermore, the use of a device being capable of operating according to both the first mode of operation and the second mode of operation allows for a highly flexible system where a device may automatically adapt itself to the prevailing environment in regard of presence of other devices operating according to the first or second mode of operation.

The invention claimed is:

1. A first sound reproduction device for reproducing a first audio signal, the first sound reproduction device being configured to operate according to a first mode and a second mode of operation; wherein, in said first mode of operation, the first sound reproduction device is configured to determine at least one first signal reproduction parameter to be used by at least one second device operating according to the second mode for processing the first audio signal when being reproduced by the at least one second device; wherein, in said second mode of operation, the first sound reproduction device is configured to reproduce the first audio signal processed according to at least one first signal reproduction parameter; wherein the first sound reproducing device further being configured to scan for presence of a device already operating according to the first mode of operation, and selecting mode of operation based on the scan for presence of a device already operating according to the first mode of operation, wherein, the first sound reproduction device is configured to, when detecting presence of a device already operating according to the first mode of operation, commence operation according to the second mode of operation; wherein the first sound reproduction device is configured to commence operation according to the first mode of operation when a device already operating according to the first mode of operation is not detected, and wherein, the first sound reproduction device is configured to, when the first sound reproduction device detects presence of a device already operating according to the first mode of operation, commence operation according to the second mode of operation following reception of the first signal reproduction parameter from the device operating according to the first mode of operation, to thereby join an ongoing reproduction of sound being carried out by one or more other devices operating according to the first and second mode.

2. A first sound reproduction device according to claim 1, the device further being configured to, in said first mode of operation:

establish a sound reproduction capability and/or a device status of at least one second sound reproduction device operating according to the second mode of operation; and determine the at least one first signal reproduction parameter for processing the first audio signal at least based on the established sound reproduction capabilities and/or device status of the at least one second sound reproduction devices operating according to the second mode of operation.

3. A first sound reproduction device according to claim 2, further being configured to, when establishing sound reproduction capabilities of a device operating according to the second mode:

transmit a request to the device operating according to the second mode to reproduce a predetermined audio signal, detect the reproduced predetermined audio signal, and utilize the detected audio signal to establish the sound reproduction capability of the sound reproduction device operating according to the second mode.

4. A first sound reproduction device according to claim 3, further being configured to:

establish the sound reproduction capabilities of the second device reproducing the predetermined audio signal through signal processing of the detected reproduced predetermined audio signal, and calculate at least one signal reproduction parameter for the second device based on the established sound reproduction capabilities.

5. A first sound reproduction device according to claim 2, further being configured to receive a representation of the sound reproduction capability of a detected sound reproduction device operating according to the second mode as one or more from:

a reproduceable frequency range of the sound reproduction device; a reproducible sound power of the sound reproduction device.

6. A first sound reproduction device according to claim 1, the device further being configured to, when operating according to said first mode of operation:

determine different signal reproduction parameters for different devices operating according to said second mode when at least two sound reproduction devices operating according to said second mode are detected.

7. A first sound reproduction device according to claim 6, wherein, the device is configured to, when determining different signal reproduction parameters for different devices operating according to said second mode, determining the signal reproduction parameter of a particular device based on sound reproduction capabilities and/or limitations of the particular device.

8. A sound reproduction device according to claim 1, further being configured to, when operating according to said first mode of operation:

establish a sound reproduction capability and/or a device status of a detected device operating according to said second mode of operation at least partly by receiving signals from the detected device representing a sound reproduction capability and/or a device status transmitted by the detected sound reproduction device operating according to said second mode.

9. A sound reproduction device according to claim 1, further being configured to, when operating according to said first mode of operation, when at least one device (202-203) operating according to the second mode of operation is detected:

receive a sound reproduction capability and/or a device status of the device operating according to the second mode of operation;

calculating, by means of calculation means, at least one first signal reproduction parameter for processing the first audio signal; and communicating the calculated at least one second signal reproduction parameter to processing means of the detected sound reproduction device operating according to the second mode.

10. A first sound reproduction device according to claim 1, the first sound reproduction device further being configured to, when operating according to said first mode of operation:

broadcast a request requesting sound reproduction devices operating according to the second mode to transmit an indication of a presence comprising at least a representation of an identity; and receive an indication of a presence comprising at least a representation of an identity of a device operating according to the second mode, the indication in response to the broadcasted request.

11. A first sound reproduction device according to claim 1, further being configured to, in said second mode of operation:

receive at least one first signal reproduction parameter for processing the first audio signal, and process and reproduce the first audio signal according to the received at least one signal reproduction parameter by means of at least one loudspeaker element.

12. A first sound reproduction device according to claim 1, further being configured to:

when operating according to said first mode of operation, request a sound reproduction device operating according to the second mode to transmit a representation of the sound reproduction capability of the device operating according to the second mode for use when calculating the sound reproduction parameters, and in response to the request, receive a representation of the sound reproduction capability of the device operating according to the second mode for use when calculating the sound reproduction parameters.

13. A first sound reproduction device according to claim 1, further being configured to, when calculating the at least one sound reproduction parameter of a plurality devices:

calculating sound reproduction parameters of devices being of a same design according to a same first set of criteria, and calculating sound reproduction parameters of devices being of a different design according to a different set of criteria.

14. A first sound reproduction device according to claim 1, further being configured to receive software, such as by downloading an application, to be stored in the sound reproduction device, for calculating the at least one first signal reproduction parameter for processing the first audio signal and/or for processing the first audio signal according to a calculated at least one first signal reproduction parameter.

15. A first sound reproduction device according to claim 14, the device further being configured to receive software to be stored in the sound reproduction device to allow the device to reproduce the first audio signal together with at least one other device that the device otherwise is not designed to reproduce sound in unison with, by the received software allowing the device to selectively operate according to the first and second mode.

16. A first sound reproduction device according to claim 1, further being configured to, when operating according to the first mode, determine the at least one first signal reproduction parameter to be used by at least one second device operating according to the second mode such that the parameter takes the current setup of devices into consideration and/or the at least one first signal reproduction parameter comprises one or more from:

a frequency range to be reproduced;

a power and/or volume level to be used in the reproduction; one or more channels of a multi-channel audio signal to be reproduced; instructions and/or algorithms for signal processing the audio signal utilising a signal processor of the device operating according to the second mode.

17. A first sound reproduction device according to claim 1, further being configured to scan for presence of a device already operating according to the first mode of operation through wireless communication to allow for detection of at least one other device and subsequent simultaneous sound reproduction of the first audio signal with at least one other device when the devices are located at a distance from each other.

18. A system comprising at least one first audio reproduction device according to claim 1, and at least one second sound reproduction device, the at least one second sound reproduction device being configured to operate according to the second mode of operation, wherein the at least one second sound reproduction device is configured to reproduce the first audio signal processed according to at least one first signal reproduction parameter received from a signal reproduction device operating according the first mode of operation.

19. A system according to claim 18, further comprising a plurality of sound reproduction devices being configured to operate according to the second mode, the plurality of devices operating according to the second mode being configured to independently receive the first audio stream for processing according to at least one first signal reproduction parameter received from a signal reproduction device operating according to the first mode of operation, respectively.

20. A method for reproducing sound performed by a first sound reproduction device configured to operate according to a first mode of operation and a second mode of operation, the method comprising:

the first sound reproduction device scanning for presence of a device already operating according to a first mode of operation;

the first sound reproduction device selecting a mode of operation based on the scan for presence of a device already operating according to the first mode of operation;

commencing, by the first sound reproduction device, operation according to the first mode of operation when a device already operating according to the first mode of operation is not detected, wherein, in said first mode of operation, the first sound reproduction device determines at least one first signal reproduction parameter to be used by at least one second device operating according to the second mode of operation for processing a first audio signal when being reproduced by the at least one second device; and commencing, by the first sound reproduction device, operation according to the second mode of operation when a device already operating according to the first mode of operation is detected, said commencing operation according to the second mode of operation following reception of a first signal reproduction parameter determined by the device operating according to the first mode of operation, to thereby join an ongoing reproduction of sound being carried out by one or more other devices operating according to the first and second mode, wherein, in said second mode of operation, the first sound reproduction device reproduces the first audio signal processed according to the received at least one first signal reproduction parameter.

21. A non-transitory computer-readable storage medium storing instructions which, when executed by a computer, cause the computer to carry out the method according to claim 20.

* * * * *